United States Patent [19]
Moore et al.

[11] Patent Number: 5,112,088
[45] Date of Patent: May 12, 1992

[54] DUCT JOINT LINK ASSEMBLY

[75] Inventors: Arthur L. Moore, Valencia; Peter Wolff, Santa Monica; Leon H. Ruther, Granada Hills; Walter E. Pike, Sylmar, all of Calif.

[73] Assignee: Stainless Steel Products, Inc., Burbank, Calif.

[21] Appl. No.: 597,184

[22] Filed: Oct. 10, 1990

[51] Int. Cl.⁵ ............................................. F16L 13/02
[52] U.S. Cl. .................................... 285/114; 285/226; 285/422; 285/286
[58] Field of Search ............... 285/226, 227, 228, 229, 285/262, 264, 265, 286, 114, 422

[56] References Cited
U.S. PATENT DOCUMENTS
930,071  8/1909  Greenlaw ........................... 285/262
3,353,846 11/1967 Peyton ............................ 285/226 X FOREIGN PATENT DOCUMENTS
2207872 8/1973 Fed. Rep. of Germany ...... 285/226
 816157 7/1959 United Kingdom ............... 285/226

Primary Examiner—Dave W. Arola
Attorney, Agent, or Firm—Harlan P. Huebner

[57] ABSTRACT

A link assembly for a bellows joint interposed in high pressure aircraft ducting wherein at least one of the links is preferably machines to have a pair of spaced apart legs of one width and an arcuate web extending therebetween of a width greater than said legs. Each of said links is preferably of a metal alloy wherein the hardness of each link differs from the other.

9 Claims, 2 Drawing Sheets

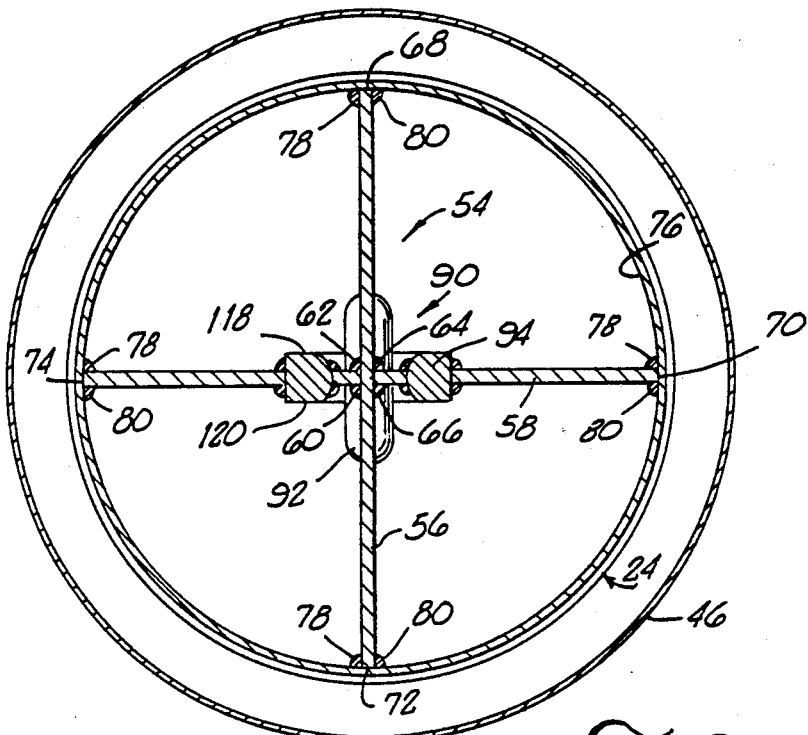
_FIG. 3._
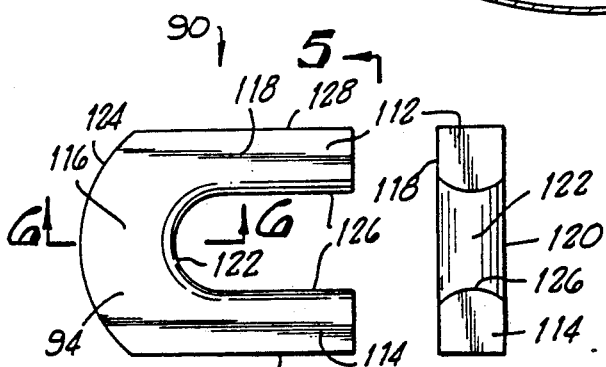
_FIG. 4._ _FIG. 5._
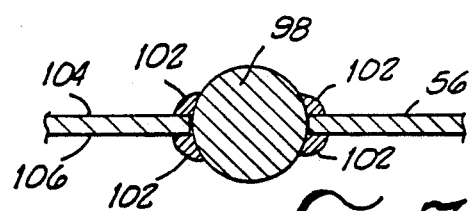
_FIG. 7._
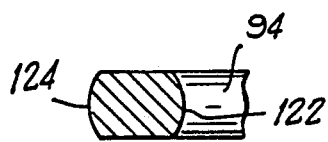
_FIG. 6._
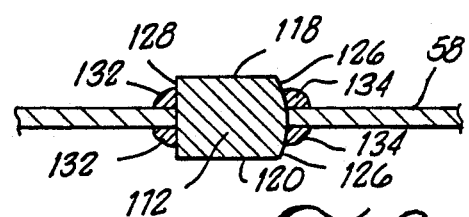
_FIG. 8._

5,112,088

DUCT JOINT LINK ASSEMBLY

BACKGROUND OF THE INVENTION

1. Field of the Invention

This invention relates to a link assembly for a high pressure aircraft bellows ducting joint to retain the joint together.

2. Description of the Prior Art

With the advent of high pressure aircraft ducting systems it became necessary to interpose joints in the ducting for two reasons. First the joints will allow a bending of the ducts around aircraft structure and also the joints allow a limited bending of the ducts at the joints with pressure changes of high pressure gases passing through the ducting.

In order to maintain the joints which are composed of two parts each secured to ducting with a bellows portion overlying the two parts, the prior art linking was used. That is there was a link on each portion of the joint and they are interlinked or locked together to allow angular movement from a central longitudinal axis of the duct, yet prevent separation of the joint by the locking together of the links against axial displacement.

The prior art links were usually formed from one metal, that is each link was formed from the same case hardened nickel metal alloy such as Inconel 718. In addition, each link was formed from identical circular stock with thicknesses that in some cases did not sustain themselves from breaking due to the rotational wear on the links. Such breakage would in turn allow the joint members to separate and allow gasses in the duct to escape causing equipment damage as well as endangering those persons aboard the aircraft.

SUMMARY OF THE INVENTION

It is a purpose of the present invention to provide a link assembly for a joint in high pressure aircraft ducting of such a configuration to increase the life of the joint.

Another object of the present invention is to provide a link assembly for a joint in high pressure aircraft ducting wherein each link is U shaped and wherein the web between the legs is of a greater diameter than the legs of the U.

A still further object of the present invention is to provide a link assembly for a joint in high pressure aircraft ducting wherein most of the exterior surfaces of at least one of the legs is relatively flat and wherein the interior surfaces of the web and the legs is arcuate.

Still a further object of the present invention is to provide a link assembly for a joint in high pressure aircraft ducting wherein there are two links that interlock and each may be made of a different alloy to achieve a longer use life even with the frictional wear of the parts one with the other. Another object of the present invention is to provide a link assembly for a joint in high pressure aircraft ducting that has at least one link having relative flat parallel surfaces that increase surface area for affixing the same to the joint.

These and other objects and advantages will become apparent from the following part of the specification wherein details have been described for the competence of disclosure, without intending to limit the scope of the invention which is set forth in the appended claims.

BRIEF DESCRIPTION OF THE DRAWINGS

These advantages may be more clearly understood from the following detailed description and by reference to the drawings in which:

FIG. 3 is a cross section of the joint taken on line 3—3 of FIG. 2;

FIG. 4 is a side elevation view of one of the new links the link assembly;

FIG. 5 is an end view taken on line 6—6 of FIG. 4 showing an end of said link;

FIG. 6 is a cross section taken line 6—6 of FIG. 4 showing the configuration of the web portion of said new link;

FIG. 7 is a cross section of the conventional link as it is welded within the system; and FIG. 8 is a cross section of the new link as it is welded within the system.

DETAILED DESCRIPTION OF THE PREFERRED EMBODIMENT

Figure 1:
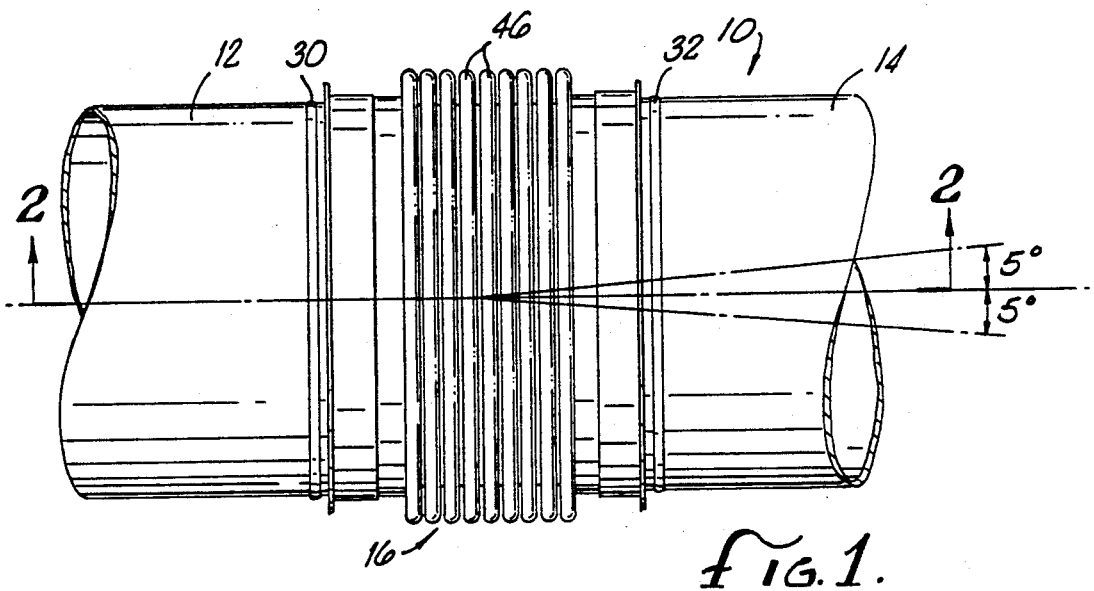
FIG. 1 is a side elevational view of a joint as installed in high pressure aircraft ducting.

In FIG. 1 there is illustrated a conventional high pressure aircraft ducting system designated 10. There is a first duct 12 and a second duct 14 both of which are preferably formed of a metal that will withstand high pressure gases, usually hot that passes through the ducting from the engine or engines of an aircraft. The diameter of the ducts may vary depending upon the need.

Because the ducting must pass around obstacles within the aircraft, and cannot always move in a straight line bellows joint means 16 are interposed between the ends 18 and 20 of the respective ducting 12 and 14.

Figure 2:
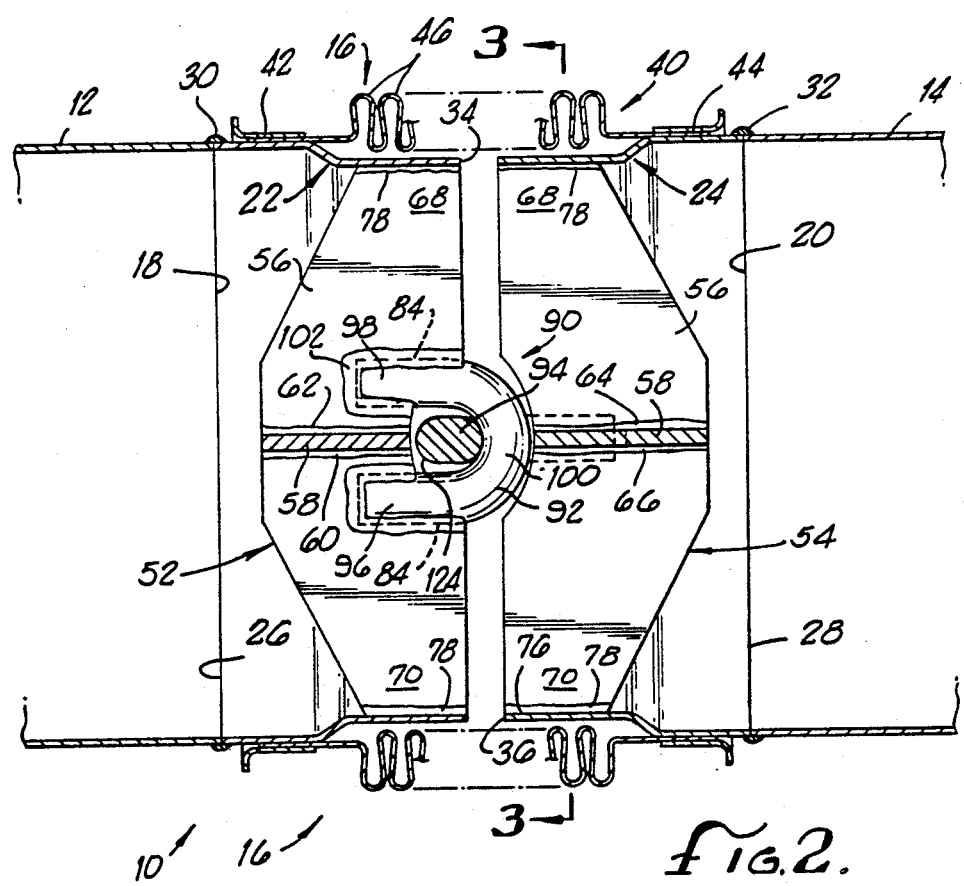
FIG. 2 is a cross section of the joint taken on line 2—2 of FIG. 1 showing the new link assembly of the invention.

As can be seen in FIG. 2 the joint means 16 is composed of preferably three parts. There is a first annual collar designated 22 and a second annual collar designated 24. The collars each have exterior ends 26 and 28 that are affixed to the ends 18 and 20 respectfully by a weld band 30 and 32.

Each of the collars 22 and 24 are stepped down forming reduced diameter interior ends 34 and 36 respectively. As can be seen in FIG. 2 the ends 34 and 36 when assembled with an annular bellows portion designated 40 are spaced one from the other.

The bellows portion 40 includes exterior flanges 42 and 44 each welded to the collars 22 and 24 respectively. Suspended between the two flanges 42 and 44 and forming a continuation thereof are a number of bellows 46.

Thus with the above description a bellows joint 16 is created. The joint 16 by the expansion of the bellows 46 will allow an axial in line separation or extension due to hot gases. In addition the joint is also designated to accept a 360° rotation of one duct 16 or 18 from a common axis to approximately a 5° bend. This will allow the flexing again either due to the heated gasses expanding the ducts or because an angle is necessary to move the ducting around an obstacles.

It is not uncommon in use that within each ducting system there are many joints.

It must also be realized that due to the construction of the joints 16 they cannot, without proper locking, withstand the pressures in the duct and would tear apart.

In order to prevent such action it was necessary to provide means to provide additional locking.

The prior art locking employed a pair of cross bars designated 52 and 54 each of which preferably includes a first plate 56, see FIGS. 2 and 3, and a second plate 58. Each plate includes a slot (not shown) wherein plate 56 slides into the slot of plate 58 and visa versa so that a cross bar is formed. In order to maintain the plates 56 and 58 together they are secured by welds 60, 62, 64 and 66 along their respective depths as seen in FIG. 2.

Each end 68, 70, 72 and 74 of the respective plates 56 and 58 are secured to inner surface 76 of the collars 22 and 24 by welds 78 and 80 respectively on each side of the plates 56 and 58.

In addition, in the preferred embodiment parallel link cutouts 84, see dotted lines in FIG. 2, are formed through the plates 56 and 58 on each side of a central axis through the duct and joint. The width of the cutouts should be sufficient to receive the link means designated 90.

The link means 90 are provided to retain the collars 22 and 24 together to assure that the joint 16 does not separate during expansion and/or angulation of one collar to the other. The bellows portion 40 is important, but is not of a strength by itself to retain the joint during extended high pressures within the ducting.

Previously the link means consisted of identical links formed from round metal alloy rods and with constant pivoting there was wear even though the material used was a case hardened nickel metal alloy such as that known as Inconel 718. The constant wear together with the axial pressure caused one of the links to break and the joint was destroyed and the ducting opened at the joint.

With the present link means two of the new links, to be discussed, may be used to increase the life and usefulness of the joint or one new link together with one of the prior art links may be used and there is an increase in the life of the joint.

The link means 90 includes a pair of links 92 and 94 one secured to the cross bar 52 and the other link 94 linked to the first link 92 forming a universal pivotable connection.

As illustrated in the link 92 is the conventional link which is formed from annular rod stock. The link 92 is preferably U shaped with a pair of parallel legs 96 and 98 joined together by an arcuate web 100.

The legs 96 and 98 are inserted within the link cutouts 84 and secured therein by welding 102 that unites the legs with the cross bar. FIG. 7 shows an enlarged cross section where the welding 102 is on each side of the leg and it expends for a greater than normal angle from surfaces 104 and 106 to the circular leg 98. When two such links are so welded it has been found that the increased area of welds 192, that is greater than a 90° angle could have a tendency to in effect weaken the union of leg and cross bar so that when both are so welded the weakness is compounded and breakage may occur.

However, with the present invention it is found that the new construction of at least one link 94 strengthens and increases useful life of the joint means 16.

Referring in particular to FIGS. 4, 5, 6, and 8 the new link 94 still includes a pair of parallel legs 112 and 114 and a arcuate web portion 116 uniting said legs. However, the upper and lower surfaces 118 and 120 of the link 94 are flat and preferably generally parallel with each other. The flat surfaces 118 and 120 extend along both sides of the legs 112 and 114 as well as the web portion 116.

As can be seen in FIGS. 2 and 4 the thickness of the web portion 116 from its inside surface 122 to its exterior surface 124 is greater than the thickness of the respective legs 112 and 114. In addition, the exterior surface 124 may be rounded between the surfaces 118 and 120 as seen in FIG. 6. However, if additional strength is necessary the exterior surface 124 may be flat which adds more material to the link 94.

The interior surface 122 of the web 116 and interior surfaces 126 of legs 112 and 114 are also rounded. The purpose of the rounded interior surfaces 122 and 126 is to assure a smooth mating the interior rounded surface of a conventional link 92 or a link corresponding to the link 94. In that way the friction wear contact area of the respective links is reduced which also adds to increased life of the joint 16.

In addition with the web portion 116 increased over the leg thickness there is greater increased strength whereby the incident of breakage during use is greatly reduced or eliminated.

Further due to the configuration of the legs 112 and 114 the exterior surfaces 128 and 130 are flat and thus normal to the plane of the cross bar plate 58, see FIG. 8. In that way the welds 132 are restricted to area which is desirable to increase the strength of the weld. In addition, the curved surface 126 of the leg is not truly circular but arcuate and the welds 134 again are less than the welds 102 in area.

Both of the above constructions for the leg 94 is important so that the securement to the cross bars is enhanced and increased. This will also prevent a breaking of the link means during high pressure gas use of the ducts.

Also in the preferred embodiment of the links 94 they are machined and not rolled. This is due to the unique shapes and construction. In addition it has been found that by using another type of metal alloy of a different hardness referred to as "L605" to form the link 94, L605 is a cobalt alloy with high lubricity; strength is increased and friction reduced due to using alloys of a different hardness.

Thus a conventional link 92 of "Inconel 718" when used with a unique link 94 of either "Inconel 718" or "L605" is found to increase the life of the joint for the ducting system 10. In addition, two of the new links 94 may also be used and interlocked together which would further increase the life of the joint.

As a modification to the present invention the cross bars do not have to have cutouts 84 formed therein for the links 92 and 94. It is possible to form the cross bars without the cutouts 84 and the links may each be inserted between the cross bars and welded to the exterior normal surfaces of the two crossbars.

The invention and its attendant advantages will be understood from the foregoing description and it will be apparent that various changes may be made in the form, construction and arrangements of the parts without departing from the spirit and scope thereof or sacrificing its material advantages, the arrangements herein before described being merely by way of example. We do not wish to be restricted to the specific forms shown or uses mentioned, except as defined in the accompanying claims, wherein various portions have been separated for clarity of reading and not for emphasis.

We claim:

1. In a bellows joint for use in a high pressure aircraft ducting system to unite one duct with another wherein there is a first collar secured to a first duct and a second collar secured to a second duct and each collar includes cross bars extending across the diameters of each of said collars and a bellows means exterior of said collars which unites said collars yet is yieldable to allow flexing of said joint due to required angulation of said ducting system as well as due to gas pressures created in said aircraft ducting system, the improvement including:

a pair of link leg cutouts in each of said cross bars;

link means in the form of a pair of U shaped link members interlocked one with the other with each being secured within said link leg cutouts of said cross bars to retain said joint in an operable united relationship yet allowing flexing of one of said collars with the other, wherein each link includes a pair of generally parallel legs and a web portion extending between said legs;

weld bands securing said legs within said link leg cutouts, and at least some of said weld bands secure said bars and said legs at right angles to each other whereby excessive welds uniting parts at a greater than 90° degrees to each other is avoided;

at least one of said U shaped links having a web portion of a greater width than either of said leg portions, and the thickness of each leg and web defined by a common flat parallel top and bottom surface and each leg having exterior sides which are normal to the plane of said top and bottom flat surface; and said web and legs having curved interior sides all on a common plane whereby when engaged by said other link member rotation of either link will be accomplished at reduced frictional contact.

2. In a bellows as defined in claim 1 wherein:

the web portion of said link is arcuate as it extends between said legs and it includes an arcuate exterior surface between said legs wherein said greater width takes place between said arcuate exterior and said arcuate interior surfaces.

3. In a bellows as defined in claim 1 wherein:

both of said U shaped links have web portions of greater widths than said leg portions and the thickness of each leg and web is defined by common flat parallel top and bottom surfaces and each leg has exterior sides which are normal to the plane of said top and bottom flat surfaces; and each of said webs and legs has curved interior sides all on a common plane respectively whereby when said links are engaged together rotation of either link will be accomplished at reduced frictional contact.

4. In a bellows as defined in claim 1 wherein:

one of said links is formed of a metal alloy of one hardness; and said other of said links is formed of a metal alloy of a different hardness than the other whereby frictional wear between said links is reduced.

5. In a bellows as defined in claim 1 wherein:

one of said links is machined to form the configuration defined therein; and said other link is bent to shape from round bar stock wherein said legs and web are each of a uniform common thickness.

6. A flexible bellows joint for use in a high pressure aircraft ducting system to unite one piece of ducting to another piece of ducting comprising:

a first collar welded to one piece of ducting;

a second collar welded to another piece of ducting;

an annular bellows encompassing said collars and secured to said first and second collars, said bellows retaining said collars in axial alignment yet yieldable to angular displacement of either of said collars from an axial line through said ducts and said collars;

each of said collars includes a pair of cross bars extending across the diameter of said collars;

a pair of link leg cutouts formed in each of said cross bars;

a pair of interlocking U shaped link members each secured within said link by leg cutouts of a respective crossbar to retain said joint in an operable united axial relationship yet adapted to allow flexing of said collars from said axial alignment;

well bands securing said legs within said link leg cutouts;

at least one of said U shaped links having a web portion of a greater width than either of said leg portions, and the thickness of each leg and web defined by common flat parallel top and bottom surfaces and each leg having exterior sides normal to the plane of said top and bottom flat surfaces; and said web and legs having curved interior sides all on a common plane whereby when engaged by said other link member rotation of either link will be accomplished at reduced frictional contact.

7. A flexible bellows joint as defined in claim 6 wherein:

said other of said link members is formed from round rod stock wherein the web and legs are all of a common thickness dimension.

8. A flexible bellows joint as defined in claim 6 wherein:

each of said link members is formed of a metal alloy of a different hardness than the other.

9. A flexible bellows joint as defined in claim 6 wherein:

one link is formed from a case harden metal alloy; and said other link is formed from a cobalt metal alloy with high lubricity to reduce wear due to reduced friction between the two links.

* * * * *